Figure 1:
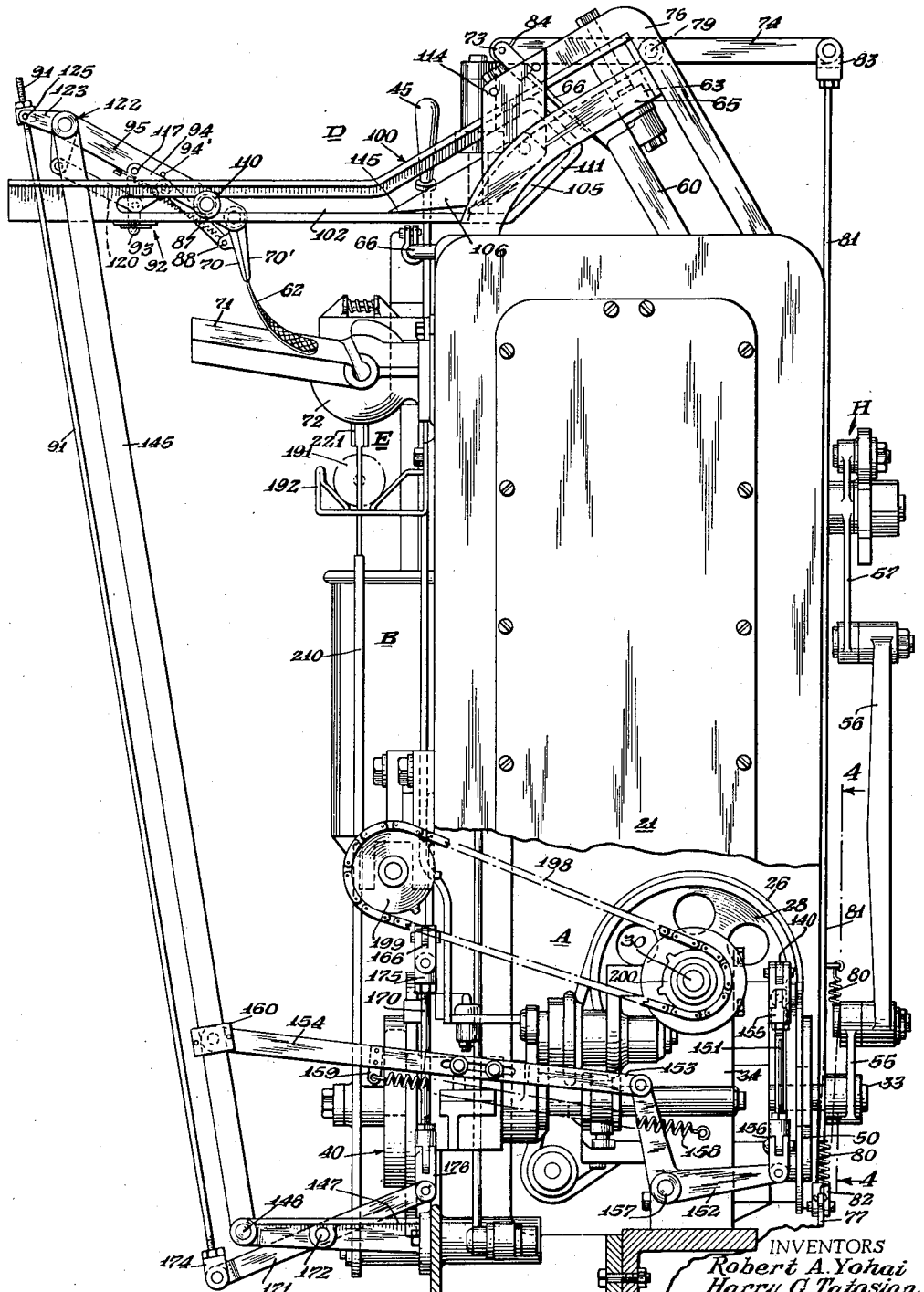

June 15, 1943.   H. G. TATOSIAN   2,321,634
MACHINE FOR MAKING AND SHAPING CAKES
Original Filed Nov. 2, 1939    7 Sheets-Sheet 1

INVENTORS
Robert A. Yohai
Harry G. Tatosian
BY Richard Newling
ATTORNEY.

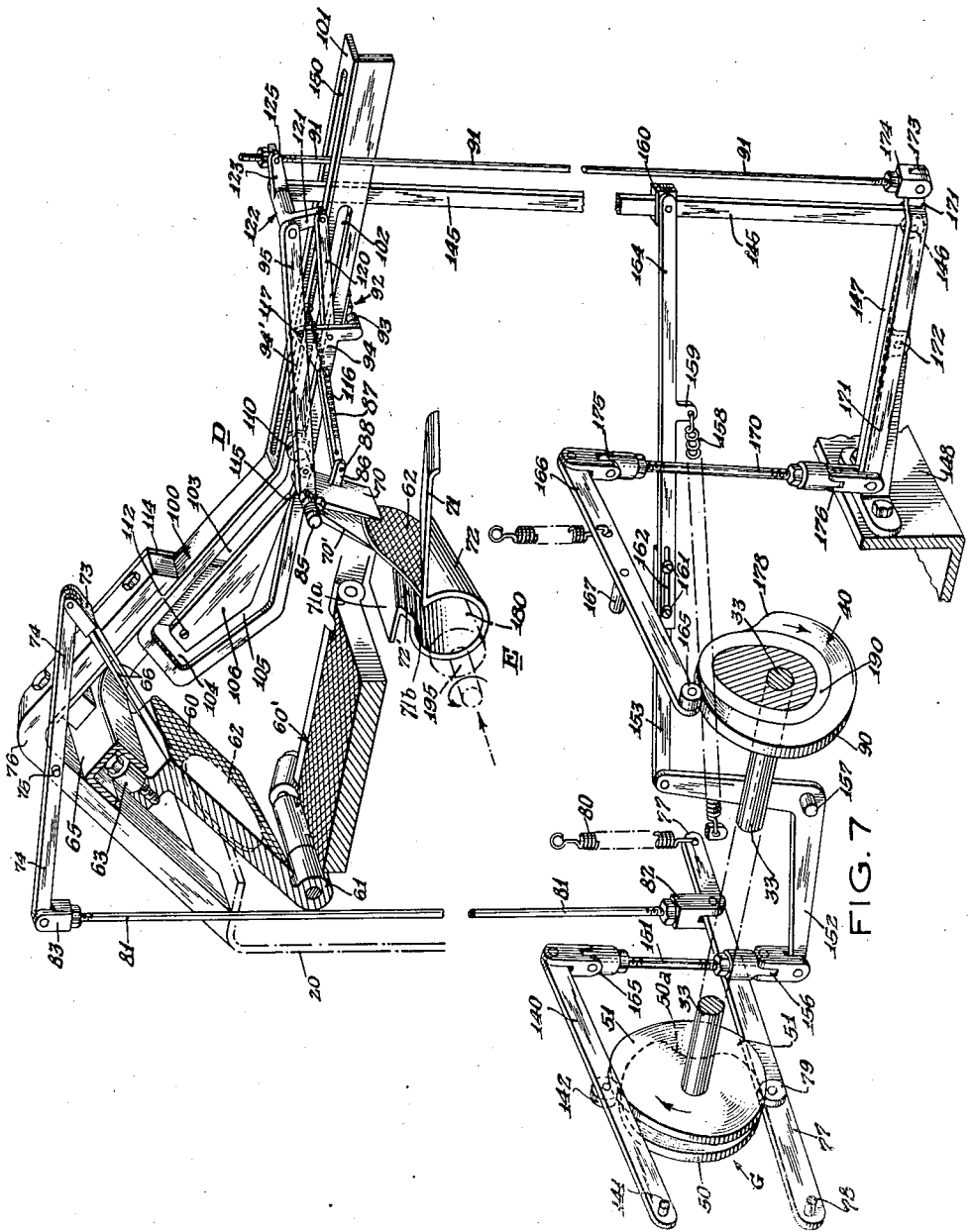

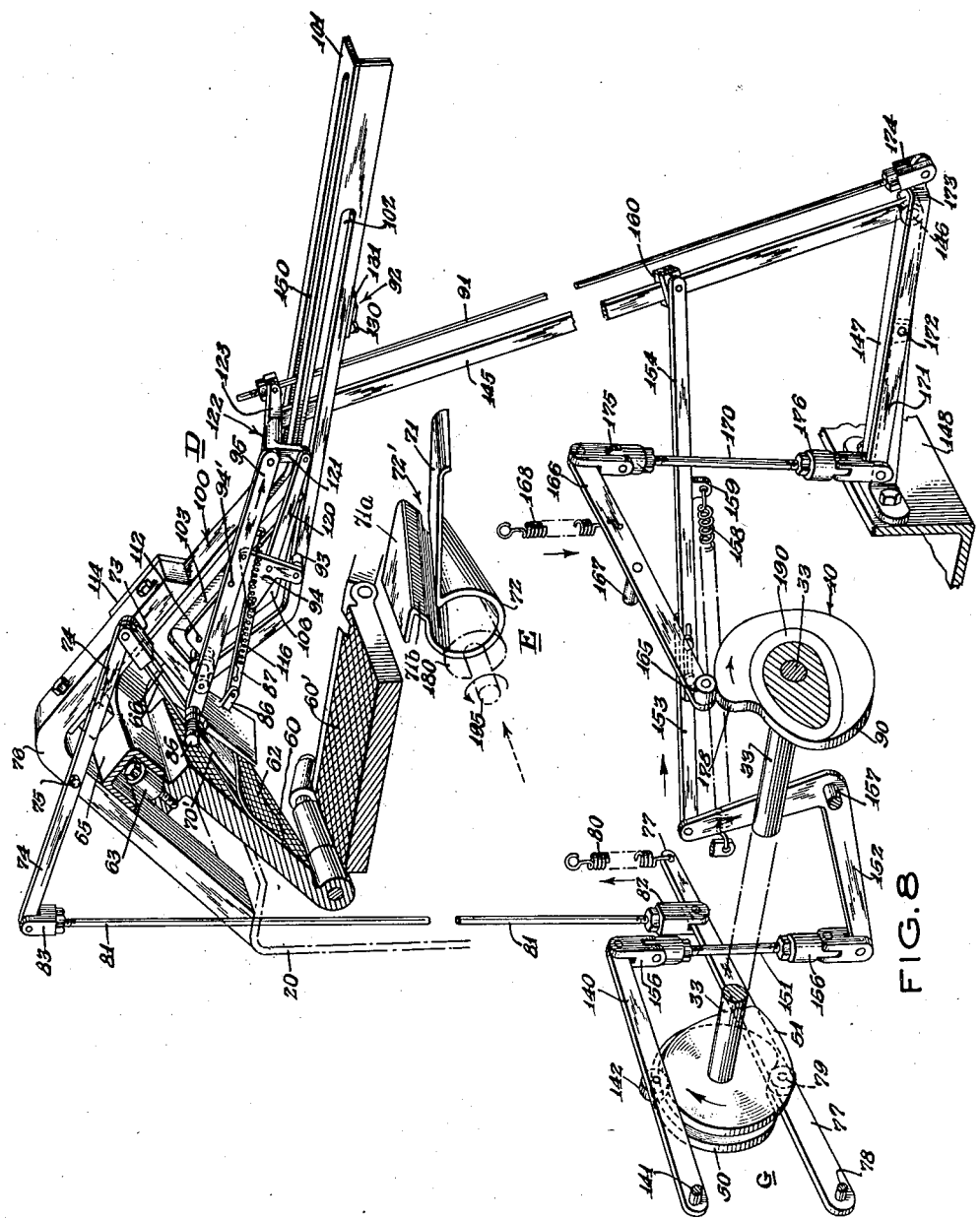

June 15, 1943.  H. G. TATOSIAN  2,321,634
MACHINE FOR MAKING AND SHAPING CAKES
Original Filed Nov. 2, 1939   7 Sheets-Sheet 7
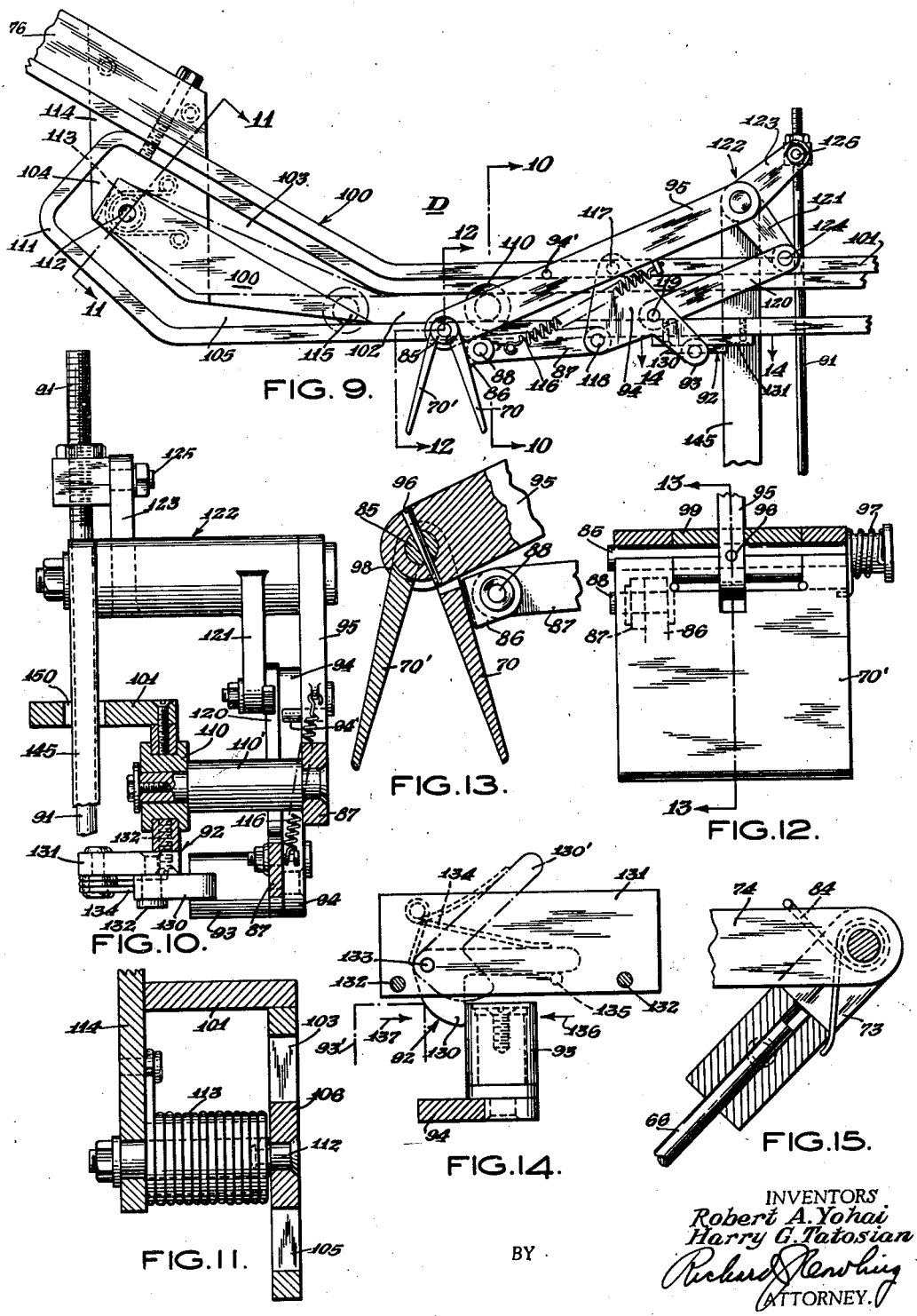
INVENTORS
Robert A. Yohai
Harry G. Tatosian
BY
Richard S. Newling
ATTORNEY.

Patented June 15, 1943

2,321,634

UNITED STATES PATENT OFFICE 2,321,634

MACHINE FOR MAKING AND SHAPING CAKES

Harry G. Tatosian and Robert A. Yohai, New York, N. Y.

Original application November 2, 1939, Serial No. 302,532. Divided and this application December 30, 1940, Serial No. 372,314

20 Claims. (Cl. 107—58)

This application is a division of our co-pending application Serial No. 302,532, filed November 2, 1939, and relates to automatic pastry shaping devices being particularly directed to apparatus for automatically baking, forming and shaping pastry in the form of a cone.

In accordance with the present invention, plastic batter cakes are formed in a continuous operation with intermittently advancing baking irons. The batter cakes are arranged for automatic stripping from the baking irons when the baking thereof is completed and while still in a plastic state, and then gripped by novel gripping mechanism. The gripping mechanism is arranged to carry the plastic batter cakes away from the baking irons to the cone-shaping apparatus. Upon reaching the cone-shaping apparatus, automatic actuation is effected to properly orient the batter cake and deliver it therein in synchronism with the operation of the cone-shaping spindle to produce the completed cones.

The general apparatus for forming and baking the batter cakes and also shaping them corresponds to that described in our U. S. Patent No. 2,213,727, issued September 3, 1940.

The present invention is specifically directed to automatically successively transfer the batter cakes while in a plastic state from the individual baking irons to the cone-forming apparatus in proper sequence and synchronization with the remainder of the operations of the machine.

The invention provides novel arrangements for the gripper and transfer apparatus, insuring a positive and fool-proof operation of the machine in order that a completely satisfactory, automatic mechanism results.

It is accordingly among the objects of our present invention to provide a novel, automatic, cone-forming mechanism eliminating intermediate manual steps between the charging of the baking irons with dough and the final formation of the cone; to provide a novel batter cake gripper and transfer mechanism and associated controls synchronized with the other units of the machine; and to coordinate the successive units of the cone-forming machine to insure simplified and fool-proof operation thereof in the automatic production of the cones.

Figures 2, 5:
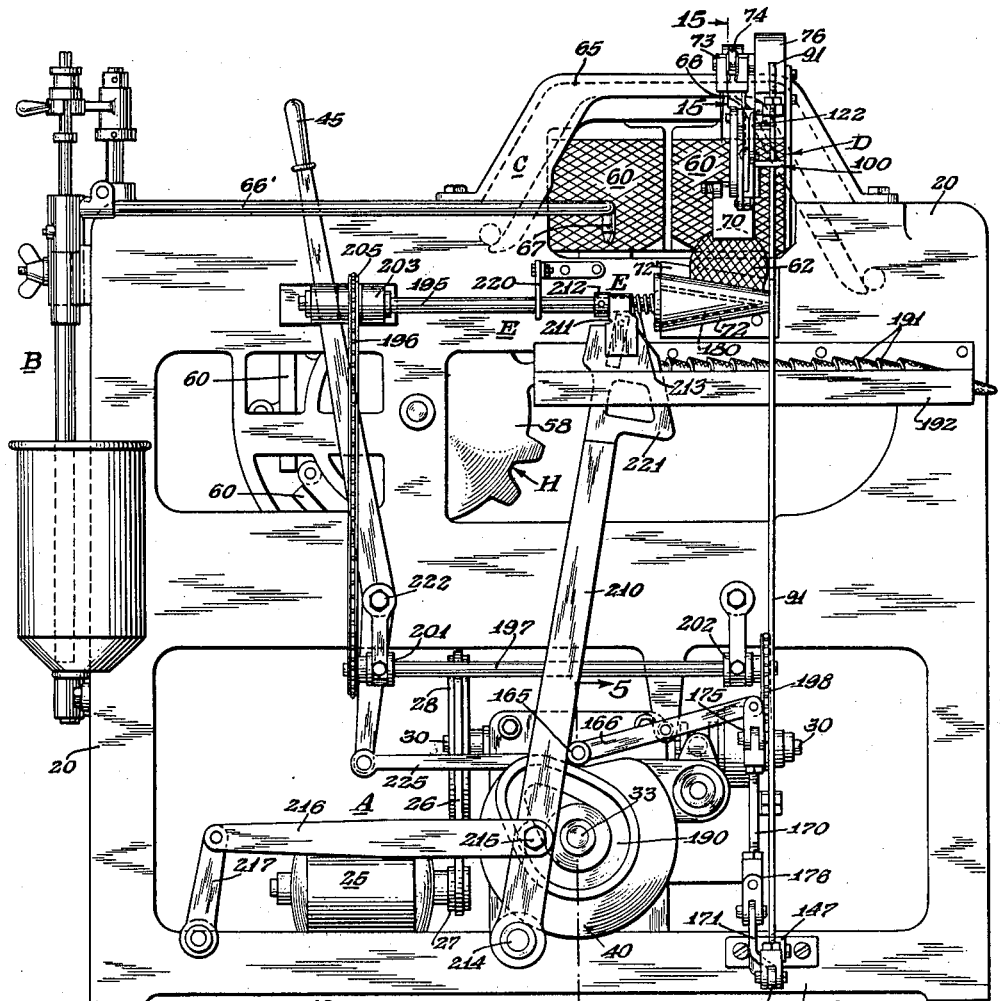
Figure 3:
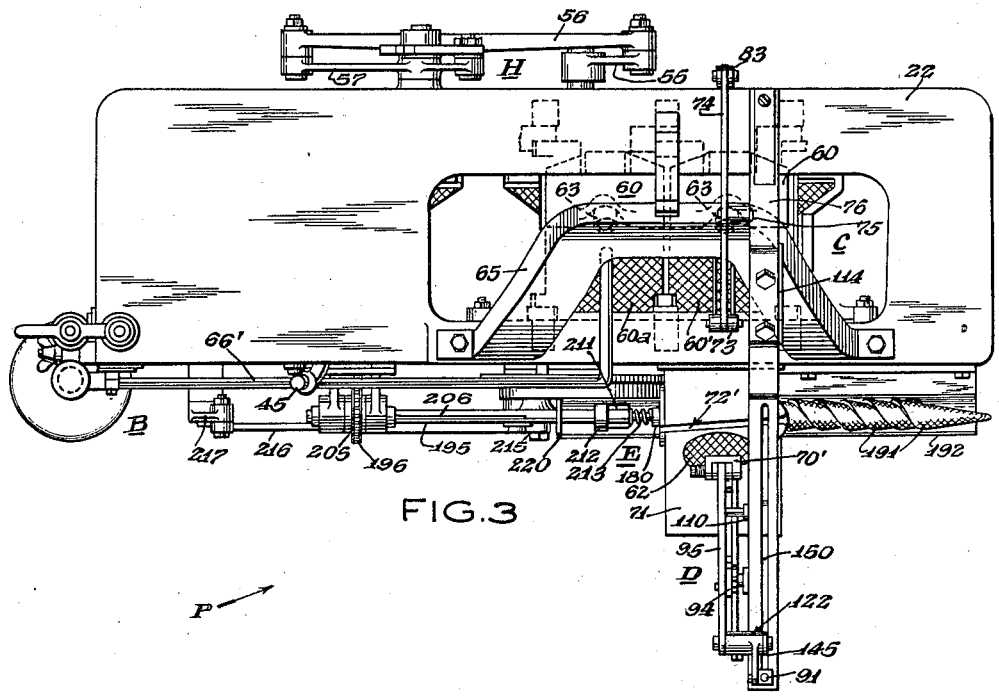
Figure 4:
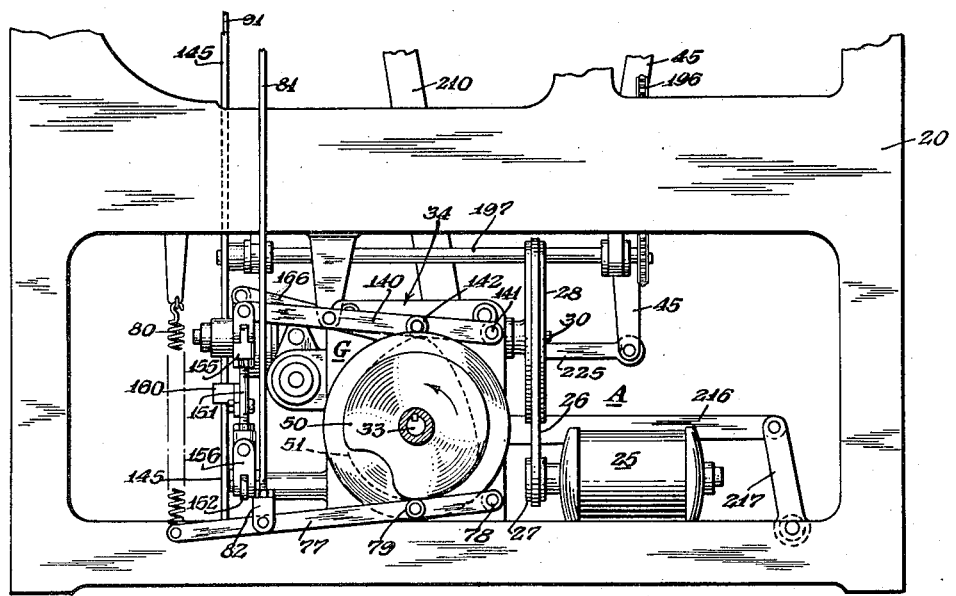

These and other objects, advantages, and features of the present invention will appear from the subjoined, detailed description of one specific embodiment thereof illustrated in the accompanying drawings, in which:

Fig. 1 is an end view of the machine with the end plate partially broken away to show the control drive mechanism, Fig. 2 is a front elevational view of the machine, Fig. 3 is a plan view of the machine, Fig. 4 is a rear elevational view of the bottom portion of the machine, partly in section, showing the control drive mechanism viewed along the line 4—4 of Fig. 1, Fig. 5 is a vertical cross-sectional view through the control drive mechanism taken along the line 5—5 of Fig. 2, Figs. 6, 7 and 8 are schematic illustrations, in perspective form, showing several positions of the batter cake transferring apparatus, as viewed from a position at the front and left of the machine indicated at P in Fig. 3.

Fig. 9 is an enlarged elevational view of the cake gripper mechanism,

Fig. 10 is an enlarged cross-sectional view through the cake gripper mechanism taken along the line 10—10 of Fig. 9, Fig. 11 is the cross-sectional view through a portion of the track guide for the gripper mechanism taken along the line 11—11 of Fig. 9, Fig. 12 is a front view of the cake gripper device, partially in section, as taken along the broken line 12—12 of Fig. 9, Fig. 13 is a vertical cross-sectional view through the cake gripper device taken along the line 13—13 of Fig. 12, Fig. 14 is a horizontal sectional view through a detail of the cake gripper mechanism as taken along the line 14—14 of Fig. 9, and Fig. 15 is a cross-sectional view of a detail of the cake transferring mechanism taken along the line 15—15 of Fig. 2.

The machine of the present invention comprises essentially a coordinated system driven from a common motor drive for extruding a predetermined charge of batter upon baking irons, feeding the baking irons at a predetermined rate over a heater to form plastic cakes, automatically removing the cakes from the baking irons and transferring them by gripper mechanism to the cone-forming unit, and finally removing the completed cones. As hereinabove stated, the form and physical embodiment of the machine illustrated in the drawings is similar to that described in our U. S. Patent No. 2,213,727, with the addition of the novel automatic cake gripping and transferring mechanism arranged to remove the plastic batter cakes from the baking irons and introduce them to the cone-forming device.

The latter mechanism constitutes the essential basis of the present application coordinating with the prior described apparatus, rendering it fully automatic. The cake transferring apparatus eliminates the manual counterpart thereof of the prior machine, and is synchronized with the other operations of the machine, resulting in efficient, uniform and rapid cone production.

Figs. 1, 2 and 3 are respectively end, front, and plan views of the apparatus of the present invention. The unitary control and drive mechanism for the apparatus is located in the bottom portion thereof at A. The batter feed device which stores and intermittently feeds predetermined charges of dough to the baking irons, is indicated at B. The intermittently driven baking elements are located at C coacting with a heating arrangement not shown in the drawings but illustrated in detail in the above-mentioned patent. The batter cake transferring mechanism is illustrated at D. The cone-shaping apparatus is generally indicated at E.

The manufacturing machine is built between frame uprights 20, 20. Plates 21 cover the ends of the apparatus as shown in Fig. 1. A transverse frame member 22 is located along the top portion, as shown in Fig. 3. The control and drive mechanism for the entire machine is located near the bottom region at position A. A source of motive power is indicated at 25 comprising an electric motor in the preferred embodiment. Motor 25 is driven at a continuous predetermined speed, determining the speed of the cone production. Motor 25 drives the control apparatus proper through belt 26 and pulleys 27, 28 arranged for speed reduction. Pulley 28 is secured to continuously driven shaft 30 of the control mechanism. Details of the control and drive mechanism are further apparent in cross-sectional view, Fig. 5, taken along the line 5—5 of Fig. 2.

*Control and drive mechanism*

Referring now to Fig. 5, continuously driven shaft 30 contains worm 31 coacting with worm gear 32 which is keyed to control drive shaft 33. Casing 34 surrounds the worm and worm gear drive 31, 32, and contains bearings 35 and 36 for the drive shaft 33. Shaft 33 is accordingly continuously rotated by motor 25 at a predetermined speed-reduction effective through pulleys 27, 28 and gearing 31, 32.

At the right end of shaft 33 is mounted control system F arranged for actuating the cake-gripper device and the cone-forming apparatus E in a manner to be hereinafter described. Control system F comprises cam member 40 rotatably mounted on drive shaft 33, integrally carrying positive clutch element 41 coactable with clutch member 42 slidably keyed with shaft 33 by key 43. Cam member 40 is driven by shaft 33 when positive clutch elements 41 and 42 are engaged by hand lever 45 (Fig. 2), which controls the axial position of clutch member 42 through suitable linkage mechanism to be described, connected to bifurcated member 46 coupled with clutch element 42.

The cam system for controlling the operation of the batter cake gripping and transferring mechanism is located at G near the left end of drive shaft 33. The cam system G comprises cams 50 and 51 fastened together on opposite sides of guard disc 50' by screws 52. Cam 51 contains hub 53 which is connected to shaft 33 by key 54. Cams 50 and 51 are accordingly driven in unison at a continuous rate by continuously driven shaft 33. Further details of the operation of cake transferring cam system G will be described in connection with Figs. 6, 7 and 8.

Cake baking apparatus C is intermittently driven step by step by drive system H. Crank 55, secured to the left end of shaft 33 in Fig. 5 is coupled to bell-crank 57 in turn connected with sprocket gear 58 (Fig. 2), which drives baking irons 60. The baking irons 60 are arranged in a continuous chain and driven around a burner, details of which are not illustrated in the present case, but fully illustrated and described in our patent referred to above, in connection with Figs. 5 and 9 thereof. Continuous rotation of crank 55 effects a predetermined intermittent advance of the individual baking irons in synchronism with the dough charging and cake removing mechanism. Details of batter storing and feeding apparatus B are not shown, since the operation of this element is already well-established in the art.

The operation and coordination of the dough charging and cake baking features of the machine may be found in detail in our Patent No. 2,213,727. The cake is baked in flat sheet form between the coacting baking irons. The cake is removed from the baking irons while still in a plastic state and introduced to cone-forming apparatus E. Automatic mechanism is provided in the present case to effect the removal and transfer of the batter cakes in their plastic state in synchronization and coordination with the other operations of the machine. The cake stripping, gripping and transferring mechanism, generally indicated at D, constitutes specifically and in combination with the other components of the machine, the basis of the present invention.

*Cake gripper and transfer mechanism*

Figure 6:
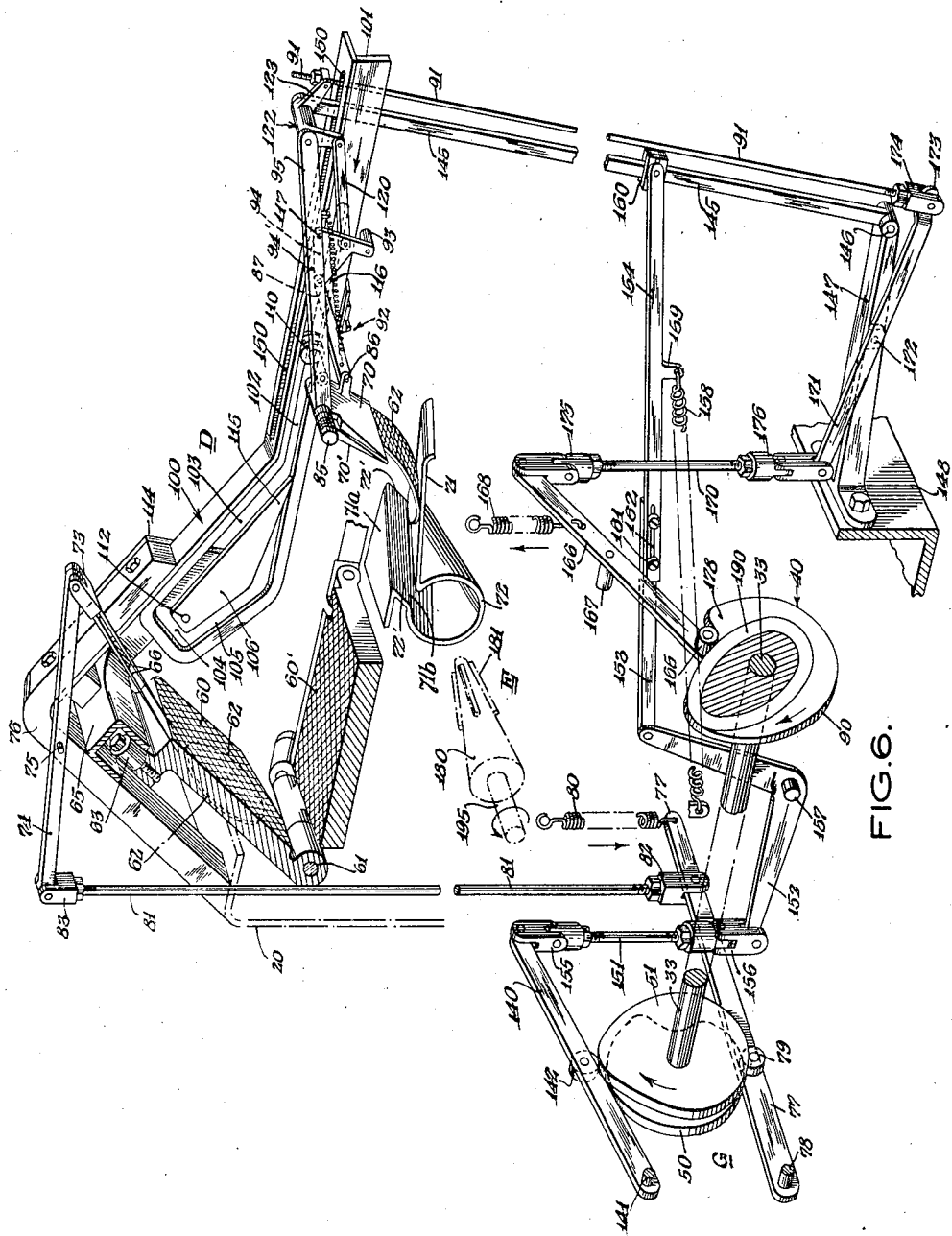

The apparatus generally indicated at D is arranged to automatically remove or strip the batter cakes baked in sheet form on baking irons, to a plastic state, and suitably transfer the cakes to cone-forming apparatus E. The operations are effected intermittently between advancements of the successive baking iron sections. Figs. 6, 7 and 8 are enlarged schematic illustrations, in perspective, of the cake gripper and transfer mechanism D in successive stages of its operation. The baking irons comprise upper plate 60 coacting with a lower plate 60' across hinge 61.

Baking irons 60, 60' are grilled or otherwise suitably embossed and indented at their coacting inner faces between which the dough is placed and then baked into sheet cake form. Baking irons 60, 60' are arranged in a chain form as indicated in Fig. 2, and are intermittently driven across an oven, not shown. Baking irons or plates 60, 60' travel in closed relation after receiving the charge of dough. When plates 60, 60' reach the position illustrated in Figs. 6, 7 and 8, the dough has been baked into a suitable plastic cake.

As baking plates 60, 60' approach the position illustrated in the figures, guide track section 65, containing rollers 63 at the front end of upper plate 60, causes plate 60 to open away from horizontal lower plate 60' as the plates advance in their regular manner. Opening baking irons 60, 60' to the position illustrated in Figs. 6, 7 and 8, exposes the baked batter cake for removal by the gripping apparatus D. The guide track 65 is arranged to maintain upper plate 60 in the open position shown for still another step in order to be charged with dough from apparatus B. Dough charging device B contains tube 66' and nozzle 67 through which the charge of dough is ejected onto the lower baking iron 60a, seen on the left in Figs. 2 and 3.

The baking of the dough charge between the baking irons is arranged in a manner such that when upper plate 60 is opened by the track and roller arrangement 63, 65, the plastic batter cake sheet 62 always adheres to the upper plate 60, as illustrated in Figs. 6 to 8. Adherence of the batter cake to the upper baking plate 60 is assured by making the grooves or indentations in the grilled face of said plate deeper than those in the lower plate 60'. A stripping finger, desirably in the form of a two-pronged fork 66 riding in the indentations of the grille face of the upper baking plate 60, is located in position above the top of cake 62 at an angle corresponding substantially to that of the upper baking plate 60. Suitable linkage mechanism, controlled by cam system G, operates fork 66 against plate 60 to strip the top portion of batter cake 62 from it prior to the gripping of the cake.

Gripper jaws 70, 70' of mechanism D, are arranged to grasp the stripped end portion of cake 62, as shown in Fig. 8, and then be moved to the right to complete the stripping of the cake off plate 60 and carry it to platform 71 of cone-forming apparatus E, prior to insertion into the apparatus, as shown in Fig. 6. Mechanism D is constructed to continue the advance of gripper jaws 70, 70' so that the gripped cake will be properly inserted into the cone-forming apparatus when the jaws of the gripper open.

The mechanism D for stripping the batter cakes from the baking irons, gripping them and transferring them suitably into cone-forming apparatus E comprises several distinct coacting parts properly synchronized and coordinated with the other units of the machine. The immediately following description relates to components of mechanism D; namely, to the stripper device 66; the gripper apparatus 70; and the associated control members for insuring gripping and then suitable releasing of the cake at proper points in the cycle of operation.

*Cake stripper*

The cake stripper comprises two-pronged fork 66 pivoted at 73 at the end of lever 74 pivoted at 75 to bracket 76 carrying track 65. Lever 74 is oscillated by cam 50 which, with cam 51, is secured to continuously rotating drive shaft 33, as described hereinabove, in connection with Fig. 5, and forming cam system G. Link 77, pivoted at 78, carries roller 79 coacting with the periphery of cam 50. Tension spring 80 is arranged at the end of link 77 to continuously mechanically bias cam follower 79 into coaction with cam 50. Link 77 is coupled with lever 74 by vertical rod 81 through clevises 82 and 83. While clevis 82 is in the lowermost position, fork 66 is in its upper position, away from the top of cake 62 on upper baking plate 60. The tips of fork 66 ride in the grooves or indentations of the plate 60. Fig. 15 is a cross-sectional view through clevis 73 pivoting fork 66 to the end of lever 74, corresponding to a cross-sectional view taken along the line 15—15 at Fig. 2. A spring 84 is arranged to mechanically bias clevis 73 clockwise against lever 74 and hence bias the points of fork 66 against baking plate 60, as shown in Figs. 6 to 8.

Once per revolution of cam 50, in proper phase relation with the operation of the machine, cutout cam section 50a permits cam follower 79 to move upwards so that tension spring 80 will lift rod 81 and correspondingly move fork 66 downward between batter cake 62 and upper plate 60, as shown in Fig. 8. The upper half of batter cake 62 is accordingly peeled away from plate 60, and droops due to gravity action preparatory to its being gripped by gripper jaws 70, 70'. The successive baking plates are advanced one step, once per revolution of shaft 33. The position of cam portion 50a is such that the cake stripping action by fork 66 occurs when the baking irons 60 for the cake are brought into the position illustrated in Figs. 6 to 8.

*Cake gripper jaws*

The cake gripper device comprises two coacting jaws 70, 70' pivoted on pin 85. Gripper jaw 70' is relatively stationary with respect to the gripper mechanism. Gripper jaw 70 is pivotally controlled with respect to jaw 70' in a manner to be described hereinafter. A projection 86 on the outside face of jaw 70 is connected with link 87 through pivot 88. Link 87 is actuated by a toggle linkage mechanism to control the opening and closing of jaws 70, 70' at the proper amount in its cycle of operation.

Cam periphery 90 of cam member 40, carried on the right end of shaft 33, controls the closure of jaws 70, 70' through suitable linkage mechanism directly activating rod 91, as will be described. The opening of the gripper jaws 70, 70' at the position in Fig. 7 during insertion of the batter cake into cone-forming mechanism E is controlled by stop 92 coacting with a follower 93 projecting from triangular plate 94 linked with a toggle control for the gripper jaws. This action will be described in more detail particularly in connection with Figs. 9 and 14.

Figs. 12 and 13 are enlarged detail views of the gripper jaws, being sectional views taken respectively along the lines 12—12 of Fig. 9, and 13—13 of Fig. 12. Left jaw 70' is relatively stationary with respect to arm 95 on which it is pivoted. Pivot shaft 85 for the jaws is pinned to the end of arm 95 by pin 96. A spring 97 is arranged about rod 85 and mechanically biases jaw 70' outwardly to its normal position against shoulder 98 of arm 95. Jaw 70' remains in the illustrated position for coaction with movable jaw 70 and is movable about shaft 85 against the action of spring 97 should it abut any object in its excursions.

Gripper jaw 70 is pivoted about rod 85 by hinge 99, being between the outer hinges of jaw 70' as shown in Fig. 12. Both jaws 70 and 70' are of the same size to suitably grip the batter cakes between them when moved into relative juxtaposition as shown in Fig. 6. In Figs. 9 and 13, the jaws are apart in the maximum degree.

*Gripper guiding mechanism*

Gripper jaws 70, 70' are moved between baking irons 60 in their open position shown, and coneforming apparatus E. The movement is in proper synchronism, and is guided by track arrangement 100. Track system 100 comprises inverted L-flange 101 containing horizontal slot 102 on its side merging with a looped slot 103, 104, 105 at the left side. A centrally pivoted track plate 106 forms a common contiguous track-wall for track sections 103, 104, 105 and is arranged to raise the gripper jaws upwardly to the position shown in Fig. 8 for gripping the batter cake 62 from the baking plate 60, then up along track section 103, then around track section 104 and down across section 105 back to horizontal track section 102 to a position near cone-forming apparatus E.

Fig. 9 is an enlarged elevational view of track guiding arrangement 100. Roller 110 is attached to gripper arm 95 adjacent the gripper jaw region. Roller 110 is arranged to ride in track slots 102 to 105 to cause the gripper to traverse the track in the proper path upon motivation by the actuating mechanism to be described further on. Track loop 103, 104, 105 is formed by looped extension 111 of L-track 101 coperating with centrally located track plate 106 pivoted at point 112. A spring 113 is mounted between supporting track 114 and plate 106 and arranged to mechanically bias the plate clockwise so that its extreme point 115 normally rests in the position illustrated in solid in Fig. 9. The enlarged cross-sectional Fig. 11, taken along the line 11—11 of Fig. 9, shows the track plate biasing arrangement, including spring 113 and pivoted plate 106.

The position of track shifter plate 106, shown in Fig. 9, communicates inclined track section 103 with horizontal track section 102, so that when the gripper jaws are moved from right to left in their excursion towards baking irons 60, the gripper jaws move upwards along track 103 to the position illustrated in Fig. 8 to a place opposite the batter cake to be removed. For removal of batter cake 62, motivation of the jaws continues to the left by operating mechanism to be described, until roller 110 is moved downwards along track section 104 and around to section 105 on its return movement.

As roller 110 passes horizontally back to the right along track section 105, track shifter plate 106 is forced out of the way against the spring 113 action, and the gripper jaws continue in their horizontal movement into adjacent section 102. The gripper jaws 70, 70' are accordingly motivated from the left to the right and back again in a predetermined cycle of operation traveling towards the left along track 102, up through track 103 to grip the batter cake, and around tracks 104 and 105 after gripping the cake, and then returning along track 102 towards the right for discharging the gripped batter cake into coneformer E in a manner to be hereinafter described.

When the roller 110 reaches the upper left hand corner of the trackway between the track sections 103 and 104, the gripper jaw 70' will be adjacent if not in contact with the grilled face of the upper open baking plate 60, and will be disposed above the drooping batter cake 62, which has been preliminarily stripped by the fork 66. Further movement of the roller 110 downwardly along the track section 104 will bring the jaw 70' behind the drooping section of the batter cake 62 and the other jaw 70 in front of it. The jaws 70 and 70' are then closed in the manner to be described and the stripping of the cake from the upper plate 60 completed, while the roller 110 is travelling in the track section 105 transversely of the cake adhering face of said plate. It will be noted the stripping of the cake 62 from the upper plate 60 is effected downwardly and away from the plate 60 to prevent any tearing or distortion in the shape of the baked cake.

Gripper mechanism D

The opening and closing of movable gripper jaw 70 against stationary gripper jaw 70' is effected by a toggle linkage action in cooperation with control rod 91 and stationary dog or stop 92. This is effected by a novel arrangement coupled to movable jaw 70 comprising link 87 directly pivoted with jaw 70 at 88 and mechanically biased towards gripper arm 95 by spring 116. Triangular plate 94 serves as a three-point linkage pivoted on arm 95 at point 117 and pivoted with link 87 at 118; and with another link 120 at point 119. Link 120 is pivoted to arm 121 of double arm lever or bell crank 122 at pivot 124. The second arm 123 of bell crank 122 is pivoted to end 125 of actuating rod 91.

Interlinked members 87, 94, 95, 120 and 121 form a toggle arrangement for controlling the opening and closing movement of movable gripper jaw 70. Arm 121 is used to effect the closing action between jaws 70, 70' under the actuation of control rod 91 by cam member 40 in a manner to be described. Fig. 10 is an enlarged cross-sectional view taken along the line 10—10 of Fig. 9 at the position of guide roller 110 of the gripper mechanism. Roller 110 is shown coacting within the slotted track portion 102 of track member 101, and is joined with link 87 through shaft 110' which carries roller 110 at its left end.

When control rod 91 is moved downwards, arm 121 is rotated clockwise carrying link 120 and rotating plate 94 on its pivot 117 to correspondingly flip link 87 directly connecting with jaw 70 towards arm 95 until plate 94 strikes stop pin 94' on arm 95, as is illustrated in Fig. 6. The tension spring 116 holds link 87 in the newly displaced position, effecting a firm closure of jaw 70 against jaw 70'. The point in the cycle of operation of the gripper mechanism D at which it is necessary to open jaw 70 from jaw 70' prior to the release of the batter cake 62 into cone-forming apparatus E is determined by roller 93, depending from triangular linkage plate 94 of the gripper toggle arrangement, abutting dog 130 of stop 92 while mechanism D is moving from right to left, i. e., from the position illustrated in Fig. 6 to that illustrated in Fig. 7.

When roller 93 abuts stop 130 during the movement of mechanism D from right to left, it causes triangular plate to rotate counter-clockwise about its pivot 117 and move link 87, by its pivot 118, away from arm 95 in a clockwise direction. This action returns link 87 from its closed or displaced position, illustrated in Fig. 6, to the open or normal position illustrated in Figs. 7 and 9. In Fig. 7, roller 93 has just abutted stop 92 to effect the opening of jaw 70 from 70'. Continued movement of the gripper mechanism to the left further rotates triangular plate 94 until its depending roller 93 has moved higher than dog 130 so that continued movement of the jaws to the left is unimpeded. The gripper jaws then continue up along track section 103 towards the next batter cake 62 in the baking iron 60, which has arrived in proper position for starting the next cycle of operation.

Fig. 14 is an enlarged detailed illustration of stop arrangement 92 coacting with roller 93 of gripper mechanism D, and corresponds to a horizontal sectional view taken along the line 14—14 of Fig. 9. Fig. 10 also shows the details of roller 93 and stop arrangement 92 in end view. Stop mechanism 92 is arranged on a horizontal plate 131 secured to track 101 by screws 132. Dog 130 is pivoted to plate 131 at pivot 133. A spring 134 is arranged to mechanically bias dog 130 to the solid position against stop pin 135. When roller 93 of gripper mechanism D is moving from right to left, as indicated by arrow 136, it abuts the head of dog 130 as illustrated in Fig. 14, to effect the opening of the gripper jaws 70, 70' in the manner described.

An important feature of the jaw opening mechanism resides in that dog 130 is arranged so that the jaws are not opened while gripper mechanism D carries the plastic batter cake from irons 60 at the left to its extreme right excursion, and passes stop 92 on the way from left to right. The reason for this will be apparent hereinafter, and at present it is sufficient to state that batter cake 62 is first moved beyond the receiving slot 72' of the conical female cone forming mold member E to the right until the cake reaches the feed table or platform 71, as shown in Fig. 6, and properly inserted into receiving slot 72' in a direction from right to left. The pivotal arrangement of dog 130 about pivot 133 permits this action.

When roller 93 is in position 93' shown in dotted lines in Fig. 14, and moving from left to right as arrow 137 indicates, roller 93 abuts the rounded side of dog 130, forcing dog 130 to pivot about point 133 into the dotted position indicated at 130'. The gripper mechanism D is accordingly permitted to move from left to right and maintain gripper jaws 70, 70' firmly engaged. When the closed jaw mechanism, however, then returns from right to left, roller 93 abuts dog 130 to open gripper jaw 70 at the proper instant and release batter cake 62 into cone-former apparatus E, as shown in Fig. 7.

Gripper motivating system

The gripper mechanism D is arranged to be reciprocated between baking irons 60 shown at the left in Figs. 6 to 8, and the extreme right position, beyond cone-forming mechanism E. This motivation is cyclic in nature and is effected by cam 51 secured with continuously rotating drive shaft 33 in the following manner: Reference is made to Figs. 6, 7 and 8 in the following description. Link 140 is pivoted at 141 and carries cam follower 142 cooperating with the periphery of cam 51. Rod 145 is pivotally supported at its end 146 on bracket 147 extending from frame portion 148 of the machine. The opposite end of rectangular rod 145 is linked with bell crank 122 at the right end of the toggle mechanism of the gripper device.

Rod 145 is guided in slot 150 in the horizontal leg of track frame 101. Rod 145 is arranged to be oscillated along track 150 under the actuation of cam 51. A linkage arrangement connects an intermediate portion of rod 145 with the end of lever 140 as follows: rod 151, L-lever 152 and adjustable link 153, 154. Rod 151 is joined to levers 140 and 152 through universal joints 155 and 156. Universal joints 155, 156 are employed to compensate for non-linear movements between the ends of levers 140 and 152. L-lever 152 is pivoted at 157, and in its oscillation carries link 153, 154 in a reciprocatory movement to in turn oscillate rod 145 along slot 150 of track 101.

The oscillation of rod 145 between the extreme positions illustrated in Figs. 6 and 8 and back motivates gripper device D in itst cyclic movement along the track sections 102 to 105, as hereinabove described. Tension spring 158 is connected to projection 159 of link section 154, effecting a biasing action of cam follower 142 against the periphery of cam 51. Cam 51 is designed to motivate the gripper mechanism through connecting linkages 140, 151, 152, 153, 154. In proper synchronization and coordination with the stripping of cake 62 from plate 60 by fork 66 closure of jaw 70 is made against gripper jaw 70' by control rod 91, as is the introduction of the cake 62 into the cone-forming apparatus E and release of the cake.

Adjustable link 153, 154 is used to adjust the extreme points of movement of the gripper device D by rod 145. Slidable block 160 is adjustably positionable on rectangular rod 145, and link sections 153, 154 are also adjustable in total length by slots 162 and bolts 161 therein. By suitably adjusting the total length of link 153, 154 and the position of block 160 on rod 145, the extreme movements of the gripper device D is accurately predetermined.

Gripper jaw control arrangement

Movable gripper jaw 70 is arranged to be moved against stationary jaw 70' when the gripper mechanism D is in the position illustrated in Fig. 8, corresponding to the time when fork 66 peels the top section of batter cake 62 from open baking plate 60. Cammed periphery 90 of cam member 40, mounted on the right end of shaft 33, is designed to effect closure of jaws 70, 70' at the proper instant through appropriate linkage mechanism action on the gripper toggle arrangement as follows:

Cam follower 165 coacts with cam periphery 90 and is attached to one end of lever 166 pivoted at 167. Tension spring 168, normally secured to lever 166, biases cam follower 165 against cam 90. Lever 166 is mechanically joined with control rod 91 through rod 170 and lever 171. Lever 171 is pivoted on extending bracket 147 at pivot point 172. The other end 173 of lever 171 is bent around so that rod 91 is aligned with rod 145 to freely move in slot 150 of the upper track. Control rod 91 is pivotally joined with lever end 173 by clevis 174. Rod 170 is joined with corresponding ends of levers 166 and 171 through universal joints 175 and 176. The universal joints 175, 176 are used to compensate for any non-linear movement between the lever ends due to motivation by cam 90.

Control rod 91 is accordingly reciprocated upwards or downwards in accordance with the predetermined shape of cam surface 90 acting on roller 165. In Fig. 6 the radial distance of the effective portion of the cam 90 on roller 165 is a minimum, permitting tension spring 168 to move rod 170 upwards, and thereby move control rod 91 downward. The downward movement of rod 91 operates bell crank lever 122 in a clockwise direction, effecting the movement of link 120 of the gripper toggle arrangement towards the left and move gripper link 87 to the position illustrated in Fig. 6, which corresponds to the fully closed position of jaws 70, 70'. Such closure is effected a few degrees of rotation of shaft 33 and cam 90 beyond that illustrated in Fig. 8. The maximum radial cam portion 178 of cam 90 coacts with cam follower 165, and the sudden decrease of this radius causes rod 91 to be moved downwards in the manner just described to effect closure of jaws 70, 70'.

The opening of the gripper jaws 70, 70' is not controlled by rod 91 but by stop mechanism 92 located at the proper position along the track 101. The gripper jaws remain locked upon the batter cake 62 from the moment it grips it off the baking irons 60, as shown in Fig. 8, until it completes its return excursion at the extreme right, as shown in Fig. 6, and effects a partial return movement towards the left to again abut projecting dog 130 of stop mechanism 92. When roller 93 abuts dog 130, as already described in detail in connection with Figs. 9 and 14, batter cake 62 has been deposited on the feed table or platform 71 of the cone-forming apparatus E, as illustrated in Fig. 6.

Platform or feed table 71 is inclined downwardly so that continued movement to the left of gripper 70, 70' causes the batter cake 62 to slide into slot 72' of apparatus E, as shown in Fig. 7. As the grippers reach the position illustrated in Fig. 7 over slot 72' of cone-forming apparatus E, roller 93 of the gripper mechanism abuts stop 92 effecting the opening of jaw 70 from jaw 70' discharging cake 62. Simultaneously with the introduction of cake 62 into slot 72', the rotating spindle or mandrel 180, which is the cone-shaper member, shown in dotted lines, is moved into guard 72, as shown in Figs. 7 and 8. Cone-shaper or spindle 180 contains ridges 181 which assist in gripping the batter cake to form it into the required cone shape. The jaws 70 and 70' are so operated as to release the cake only after the rotating mandrel 180 has gripped the cake in the female mold member, so that upon the release of this cake the mandrel will effect its cone-forming operation.

After the batter cake is released from gripper jaws 70, 70' and introduced to the cone-forming mechanism E as described, the gripper mechanism continues its motivation towards the left under the continuous actuation of lever 145 by cam 51 to initiate its next cycle of movement towards baking irons 60, as shown in Fig. 8, for gripping of the next batter cake and depositing it in apparatus E.

The cone-forming apparatus E comprises a conical female mold member 72, mounted on an axis substantially parallel to the hinge axis of the baking irons in stationary discharge position thereof, and is formed with a pair of opposed flanges 71a and 71 spaced to define a slot 72' constituting an entry opening for the cake into the interior of the mold member 72. The flange 71a spaced nearest to the baking irons forms a table over which the cake slides in its movement towards the right, and is elevated above the flange 71. The flange 71 inclines slightly downwardly towards the left, and serves as a feeding table for the cake as it is moved by the jaws 70 and 70' towards the left in its return movement. The section 71b of the cone-former between the mold section 72 and the flange 71a is inclined downwardly towards the left to serve as a guide surface for directing the forward edge of the cake 62 into the interior of the mold 72 as this cake is fed through the slot 72'.

The mandrel or shaper 180 has a series of spaced teeth thereon extending along its face for gripping the cone blank or cake in the process of the formation of the cone. The actuation of this mandrel 180 in synchronism with the cake transferring mechanism will be now described.

*Cone forming mechanism*

Mechanism E for forming the cone from plastic cakes 62 deposited therein is actuated by grooved cam 190 of cam member 40. Front view Fig. 2 shows the completed sugar cones 191 in trough 192. This figure also shows in elevation the introduction of batter cake 62 into slot 72' of the cone-forming apparatus E. Spindle or mandrel 180 is within cone guard 72 upon receiving plastic batter cake 62. Spindle 180 is continuously rotating to form a cone 191 from cake 62 in the usual manner.

Spindle 180 is mounted at the end of rod 195 which is rotated at a continuous rate through sprocket chain 196 connected to shaft 197 and in turn to continuously rotating shaft 30 through second sprocket chain 198 and appropriate sprocket wheels 199 and 200, as shown in Figs. 1 and 4. Shaft 197 is rotatably supported in bearings 201, 202 secured to upright frame section 20. Shaft 195 is rotatably supported in bearing 203 and is slidable therein to permit the insertion and withdrawal of spindle 180 into guard 72. Sprocket chain 196 drives shaft 195 through sprocket wheel 205, shown in elevation in Figs. 2 and 3. Spindle shaft 195 has a suitable keyway 206, as shown in Fig. 3, slidably coacting with a corresponding key in sprocket wheel 205 (not shown). Thus, shaft 195 can be reciprocated with respect to sprocket wheel 205 and be continuously rotated thereby.

Cone-shaper or spindle 180 is accordingly arranged to be inserted in guard 72 at the time batter cake 62 is delivered thereto by jaws 70, corresponding to the position illustrated in Figs. 2 and 7, and removed to permit the completed cone 191 to drop to trough 192. The illustrated mechanism for accomplishing this end is similar to that described in our aforementioned Patent No. 2,213,727. Upright lever 210 is rotatably coupled to cone rod 195 by coupling piece 211 between collar 212 attached to shaft 195 and compression spring 213. The connection between lever 210 and shaft 195 is such as to permit coupling member 211 to move shaft 195 and pivot with respect to lever 210 despite the arcuate path which lever 210 is constrained to move in due to its pivoting at 214.

A cam follower 215 is attached to lever 210 near the bottom thereof and is arranged to move within grooved cam 190 of cam member 40, as shown in Fig. 2. Supporting links 216 and 217 are pivoted to lever 210 at the position of follower 215 to suitably support the lever in its oscillatory movement. Cam 190 causes lever 210 to oscillate cone-former 180 into and out of the cone-forming mold or guard 72 in synchronization with the other coordinating operations of the machine hereinabove described. A stop 220 projects from the frame and is arranged to abut the end of the completed cone as spindle 180 moves past it, releasing the cone into trough 192. A pusher 221 projects from the top of lever 210 and rides in a slot in trough 192 to push the dropped cone 191 into alignment with the other cones, as illustrated in Fig. 2.

A lever 45 is arranged for manual actuation, to stop the reciprocating movement of cone-shaper 180 by stopping the rotation of cam member 40. Lever 45 is pivoted to frame upright 20 at pivot 222, as shown in Fig. 2 and operates link 225, which is coupled to positive clutch member 42 through fork 46, shown in Fig. 5. As previously described, clutch member 42 is slidably keyed to drive shaft 33 on key 43, and when engaged to clutch member 41 effects the continuous rotation of cam member 40.

The engagement of clutch members 41 and 42 causes the continuous operation of the apparatus in the manner previously described. However, when lever 45 is operated to disengage the clutch 41 and 42 to the position shown in Fig. 5, cam member 40 is not rotated, and cone-shaper spindle 180 is not oscillated. The control rod 91 which operates the closure of gripper jaw 70 is also rendered ineffective during this interval, since cam surface 90, which cyclicly actuates control rod 91, is also stopped since it is a part of cam member 40,

Summary of operations

In accordance with the present invention, the cone-forming machine is rendered completely automatic in that it does not require any manual operation, once the operation of the machine is started. A unitary drive and control mechanism A is incorporated for effecting all the operations in proper sequence and coordination. The batter storing and feed mechanism B is of the type arranged to properly charge the individual baking irons with dough to form the batter cakes. The baking irons are arranged in a chain, as may be partially viewed in elevation in Fig. 2, and passed over a suitable burner, not shown in the present case but clearly indicated in the drawings of our aforementioned Patent No. 2,213,727.

After suitable baking, the batter cake is somewhat cooled and in a plastic state when the top baking plate 60 is automatically opened by the raised track guide 65 to the position illustrated in the figures. The batter cake 62 adheres to the upper baking iron which is tilted at a predetermined angle when opened. A stripper fork 66 is at that time actuated while the baking unit is stationary and in discharge position to strip the top portion of the batter cake 62 away from opened iron 60. The stripped end of batter cake 62 is then engaged between jaws 70, 70' of the gripper mechanism which has arrived at that position, as shown in Fig. 8. Peripheral cam 90 then effects a downward actuation of control rod 91 to cause movable jaw 70 to close against stationary jaw 71 of the gripper and grip the batter cake 62 therebetween.

The gripper mechanism D is then motivated towards the right away from baking plates 60 under the actuation of cam 51, which oscillates control lever 145. The gripper mechanism is motivated to the right along track member 101 carrying the gripped batter cake to the extreme position shown in Fig. 6, whereupon the free end of cake 62 rests upon inclined platform 71 of the cone-forming apparatus E.

The gripper mechanism D is then motivated towards the left by the same cam 51 which controls rod 145, permitting the batter cake 62 to be introduced into slot 72' of the cone guard 72, as shown in Fig. 7. At that instant roller 93 of the gripper mechanism abuts dog 130 of stop 92 to immediately open the gripper jaws 70, 70' and effect the release of the batter cake into the cone-forming apparatus E, as shown in Figs. 2 and 7. This release is effected at the instant the mandrel 180 has gripped the cake.

The motivation of the gripper mechanism D continues towards the left up inclined track slot 103 to the position of Fig. 8 opposite the next batter cake to be gripped, thus completing the cycle of operation for the gripper mechanism. It is to be understood that in the interim the baking irons have been advanced by one position, due to their intermittent motivation through sprocket gear 58, shown in Fig. 2.

The spindle 180 is rotated during the period of its engagement with the batter cake 62 introduced into the slot 73 to instantly form it to the required cone shape. The rotation of the spindle 180 stops upon formation of the cone and is thereupon withdrawn from guard 72 by grooved cam 190 and lever 210 described in connection with Figs. 2 and 5, whereupon the completed cone is kicked off spindle 180 and dropped into position in trough 192.

It is obvious that various changes and modifications may be made in the details of construction without departing from the general spirit of the invention as set forth in the appended claims.

What is claimed is:

1. A stripping and transferring mechanism for removing and delivering flat cakes from a baking machine to a cake receiver comprising pivoting means for stripping an edge portion of a cake from its respective baking unit on said baking machine, and means adapted to be moved toward and away from said baking unit for gripping the released portion of said cake, peeling the remainder thereof from said baking unit and transferring it to said cake receiver.

2. A stripping and transferring mechanism for removing and delivering flat cakes from a baking machine to a cake receiver comprising reciprocating means for stripping an edge portion of a cake from its respective baking unit on said baking machine, and reciprocating means for gripping the released portion of said cake, peeling the remainder thereof from said baking unit and transferring it to said cake receiver.

3. A stripping and transferring mechanism for removing and delivering flat cakes from a baking machine to a cake receiver comprising means for stripping an edge portion of a cake from its respective baking unit on said baking machine, means for gripping the released portion of said cake, peeling the remainder thereof from said baking unit and transferring it to said cake receiver, and means for automatically coordinating both of said means to synchronize the operations thereof.

4. A stripping and transferring mechanism for removing and delivering flat cakes from a baking machine to a cake receiver comprising reciprocating and pivoting means for partially stripping an edge portion of a cake from its respective baking unit on said baking machine, sliding means adapted to be moved toward and away from said baking unit including a pair of gripping jaws for gripping the released portion of said cake, peeling the remainder thereof from said baking unit and transferring it to said cake receiver.

5. A stripping and transferring mechanism for removing and delivering flat cakes from a baking machine to a cake receiver comprising means including a plurality of spaced cake stripping prongs, means for yieldably urging the outer ends of said prongs against the cake adhering face of its respective baking unit, and means for positively actuating said prongs towards and away from cake stripping position.

6. A stripping and transferring mechanism for removing and delivering flat cakes from a baking machine to a cake receiver comprising a pair of substantially parallel cake stripping prongs mounted on a lever, spring means for angularly urging said stripping prongs against the cake adhering face of its respective baking unit, and means for positively actuating said lever to reciprocate said prongs towards and away from cake stripping position.

7. In a machine of the class described, a unit for baking batter into a substantially thin cake including a plate having an indented grilled surface to which said cake adheres, a cake stripping prong adapted to ride in an indentation of said surface, means for yieldably urging said stripping prong in said indentation, and means for positively actuating said prong towards and away from stripping position.

8. A stripping and transferring mechanism for removing and delivering flat cakes from a traveling baking machine to a cake receiver comprising a pair of cake stripping prongs, means for yieldably urging said stripping prongs against the cake adhering surface of the baking unit when the same is in discharge position to loosen a portion of the cake therefrom, means for reciprocating said prongs towards and away from cake stripping position in synchronism with the movement of the baking machine, and means for gripping the released portion of said cake, peeling the remainder thereof from said baking unit and transferring it to said cake receiver.

9. A stripping and transferring mechanism for removing and delivering flat cakes from a traveling baking machine to a cake receiver comprising a pair of cake stripping prongs, means for yieldably urging said stripping prongs against the cake adhering surface of the baking unit when the same is in discharge position to loosen a portion of the cake therefrom, means for reciprocating said prongs towards and away from cake stripping position in synchronism with the movement of the baking machine, means for gripping the released portion of said cake, peeling the remainder thereof from said baking unit and transferring it to said cake receiver, and means for automatically coordinating all of said means to synchronize the operations thereof.

10. A transferring mechanism for removing and delivering flat cakes from a traveling baking machine to a cake receiver comprising a pair of jaws for gripping said cake on the cake adhering face of its respective baking unit, means for reciprocating said jaws between the discharge position of the baking unit and the cake receiver, and means for guiding said jaws along a predetermined path during their reciprocating movement including a trackway having successive sections, one of said sections extending towards said baking unit transversely to its cake adhering face in discharge position thereof, a second section extending from the forward end of said first section substantially parallel to said face, and a third section extending away from said face transversely thereof.

11. A transferring mechanism for removing and delivering flat cakes from a traveling baking machine to a cake receiver comprising a pair of jaws for gripping said cake on the cake adhering face of its respective baking unit, means for reciprocating said jaws between the discharge position of the baking unit and the cake receiver, and means for guiding said jaws along a predetermined path during their reciprocating movement, including a looped trackway by which the jaws are moved towards said face, straddled over an edge portion of the cake and then moved away from said baking unit towards said cake receiver.

12. A transferring mechanism for removing and delivering flat cakes from a traveling baking machine to a cake receiver comprising a pair of jaws for gripping said cake on the cake adhering face of its respective baking unit, means for reciprocating said jaws between the discharge position of the baking unit and the cake receiver, and means for guiding said jaws along a predetermined path during their reciprocating movements, and means including a looped track section by which the jaws are moved towards said face, straddled over an edge portion of the cake and then moved away from said baking unit towards said cake receiver, and a substantially straightaway track section merging into said looped section on the side thereof substantially opposite to said plate and adapted to guide said jaws during part of their reciprocating movement.

13. A transferring mechanism for removing and delivering flat cakes from a traveling baking machine to a cake receiver comprising a pair of jaws for gripping said cake on the cake adhering face of its respective baking unit, means for reciprocating said jaws between the discharge position of the baking unit and the cake receiver, means for guiding said jaws along a predetermined path during their reciprocating movement, means including a looped track section by which the jaws are moved towards said face, straddled over an edge portion of the cake and then moved away from said baking unit towards said cake receiver, a substantially straightaway track section merging into said looped track and adapted to guide said jaws during part of their reciprocating movement, and a bias switch plate defining the trackway of said looped track section which is spring-pressed in one position to permit movement along and between said track sections in one direction and yieldable to permit movement along and between said track sections in the opposite direction.

14. A transferring mechanism for delivering cakes from a baking machine to a cake receiving section of a cone forming machine comprising reciprocating means for carrying the cake from its baking unit to a point beyond said cake receiving section and then returning said cake towards said receiving section, and means for releasing said cake from its carrying means during its return movement and substantially when said cake reaches said cake receiving section to discharge the same into said cake receiver.

15. A stripping and transferring mechanism for removing and transferring flat cakes from a baking machine to a cake receiver comprising means including a pair of spaced yieldable prongs for stripping an edge portion of a cake from its respective baking unit on said baking machine, means including a pair of jaws for gripping the released portion of said cake, peeling the remainder thereof from said baking unit and transferring the same to a point beyond the cake receiver, and means for releasing the cake from said transferring mechanism during its return movement at the time the cake is introduced into said cake receiver and engaged thereby.

16. A stripping and transferring mechanism for removing and transferring flat cakes from a baking machine to a cake receiver comprising reciprocating means including a pair of spaced yieldable prongs for stripping an edge portion of a cake from its respective baking unit on said baking machine, reciprocating means including a pair of jaws for gripping the released portion of said cake, peeling the remainder thereof from said baking unit and transferring the same to a point beyond the cake receiver, and means for releasing the cake from said transferring mechanism during its return movement at the time the cake is introduced into said cake receiver and engaged thereby.

17. In a machine for making cones, the combination with a cake baking mechanism having a plurality of pairs of baking plates arranged in succession individually carrying batter cakes, and a cone shaping mechanism, of means for opening the upper baking plates when they reach a predetermined position, a stripper device actuated against the opened plate to pry away a portion of the associated adhering batter cake, and apparatus for transferring the batter cake to said cone shaping mechanism comprising a pair of gripper jaws and control means for moving said jaws adjacent the pried cake portion, for closing said jaws about the pried cake portion, for moving the closed jaws downwardly and away from the opened baking plate and thereby removing the batter cake therefrom, for bringing the jaws opposite said cone shaping mechanism, and for opening said jaws to deliver the batter cake into said cone shaping mechanism.

18. In a machine for making cones, the combination with a cake baking mechanism having a plurality of hinged pairs of baking plates arranged in succession individually carrying batter cakes and a cone shaping mechanism having a downwardly inclined guide member for guiding batter cakes therein of means for opening the upper baking plates when they reach a predetermined position, a stripper device actuated against the opened plate to pry away a portion of the associated adhering batter cake whereby the pried portion of the batter cake droops, and apparatus for transferring the batter cake to said cone shaping mechanism comprising a pair of gripper jaws and control means for moving said jaws adjacent the drooped cake portion and closing said jaws about the cake, for moving the jaws away from the opened baking plate and remove the batter cake therefrom, for moving said gripper jaws and gripped cake beyond said cone shaping mechanism, for returning said gripper jaws in the original path towards said cone shaping mechanism and partially introduce the batter cake therein in a predetermined manner, and for opening the gripper jaws to deliver the batter cake into said cone shaping mechanism at a predetermined time.

19. In a machine for making cones, the combination with a cake baking mechanism having a plurality of pairs of baking plates arranged in succession individually carrying batter cakes and a cone shaping mechanism having a downwardly inclined guide member for properly guiding batter cakes therein of means for opening the upper baking plates to a predetermined angle when they reach a predetermined position, the contained batter cake being arranged to adhere to the upper baking plate when it is opened, a stripper device actuated against the opened plate to pry away a portion of the adhering batter cake, and apparatus for transferring the batter cake to said cone shaping mechanism comprising a pair of gripper jaws, control means for moving said jaws adjacent the pried cake portion, for closing said jaws about the cake, for carrying the jaws away from the opened baking plate and remove the batter cake therefrom, for moving said gripper jaws and gripped cake beyond said cone shaping mechanism and onto the guide member thereof, and for returning the gripper jaws in the original path towards the cone shaping mechanism and partially introducing the batter cake therein in a predetermined manner in coaction with the said inclined guide member, and means for effecting the opening of said gripper jaws at a predetermined point in the cycle to deliver said batter cake into said cone shaping mechanism at a predetermined time including a pivoted stop element secured to said machine in the path of movement of said gripper jaws and a projection associated with said apparatus for engaging said stop to effect the opening of said gripper jaws only when said jaws are moved in said return direction.

20. In a machine of the character described, apparatus for cyclically transferring batter cakes adhering on associated baking plates to a cone forming mechanism having a guide plate comprising a pair of gripper jaws, a linkage arrangement carrying said gripper jaws for actuating said jaws into open and closed positions, track means arranged to guide said jaws between said baking plates and said cone forming mechanism including a reentrant section having a biased switch-over plate in the region of said baking plates to direct said jaws in the direction towards said baking plates prior to cake gripping and in the return direction after cake gripping by said jaws, and a control system for motivating said apparatus along said track means towards said baking plates for operating said linkage arrangement to close said gripper jaws when they reach the batter cake on a baking plate, for withdrawing said gripper jaws and gripped cake from the associated baking plate around said reentrant section and towards said cone forming mechanism, for carrying said cake beyond said cone forming mechanism onto said guide plate thereof, for returning said jaws and cake in the direction towards said baking irons and for introducing said cake into said cone forming mechanism in coaction with said guide plate.

ROBERT A. YOHAI.
HARRY G. TATOSIAN.